March 25, 1958     E. B. THOMPSON     2,827,979
VEHICLE LIFT
Filed Nov. 24, 1954     5 Sheets-Sheet 3
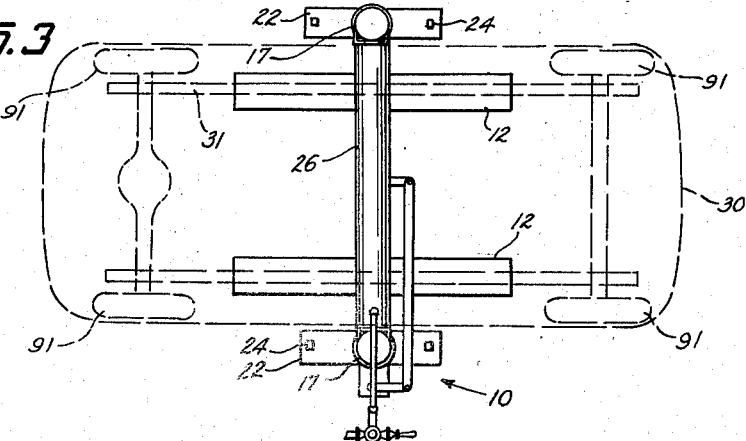
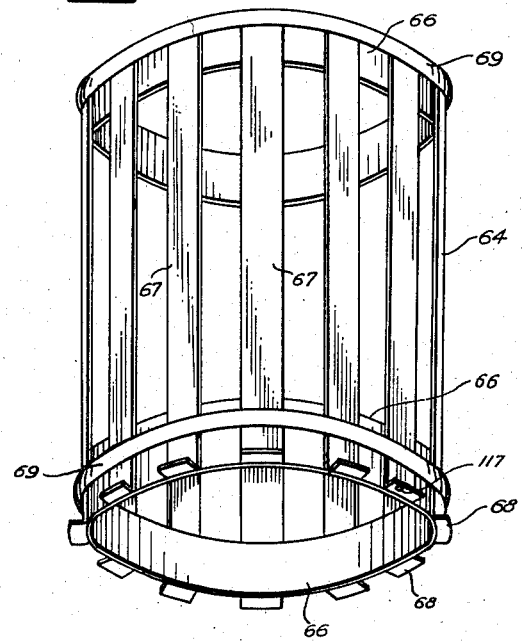
INVENTOR.
ELMER B. THOMPSON
BY
ATTORNEY.

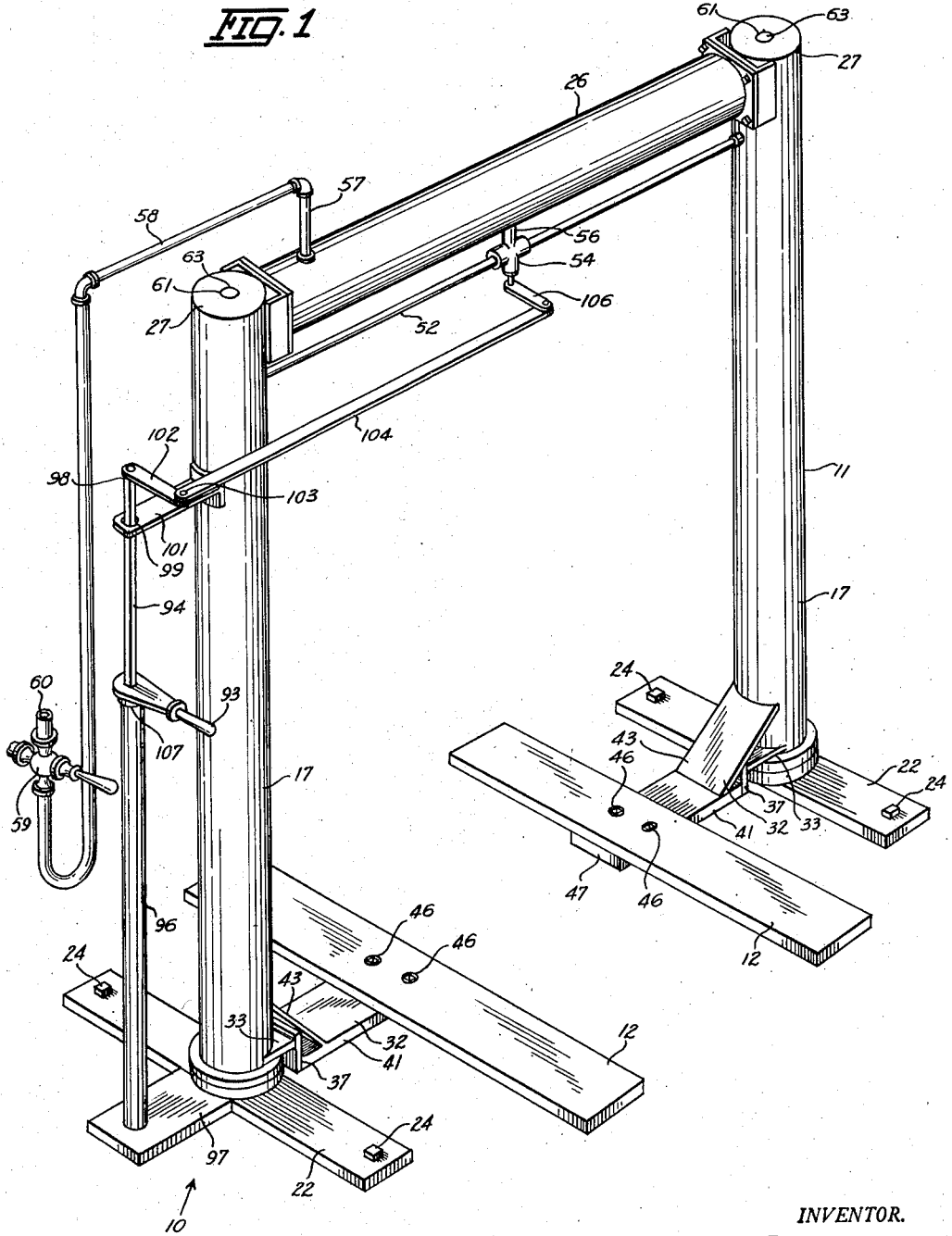

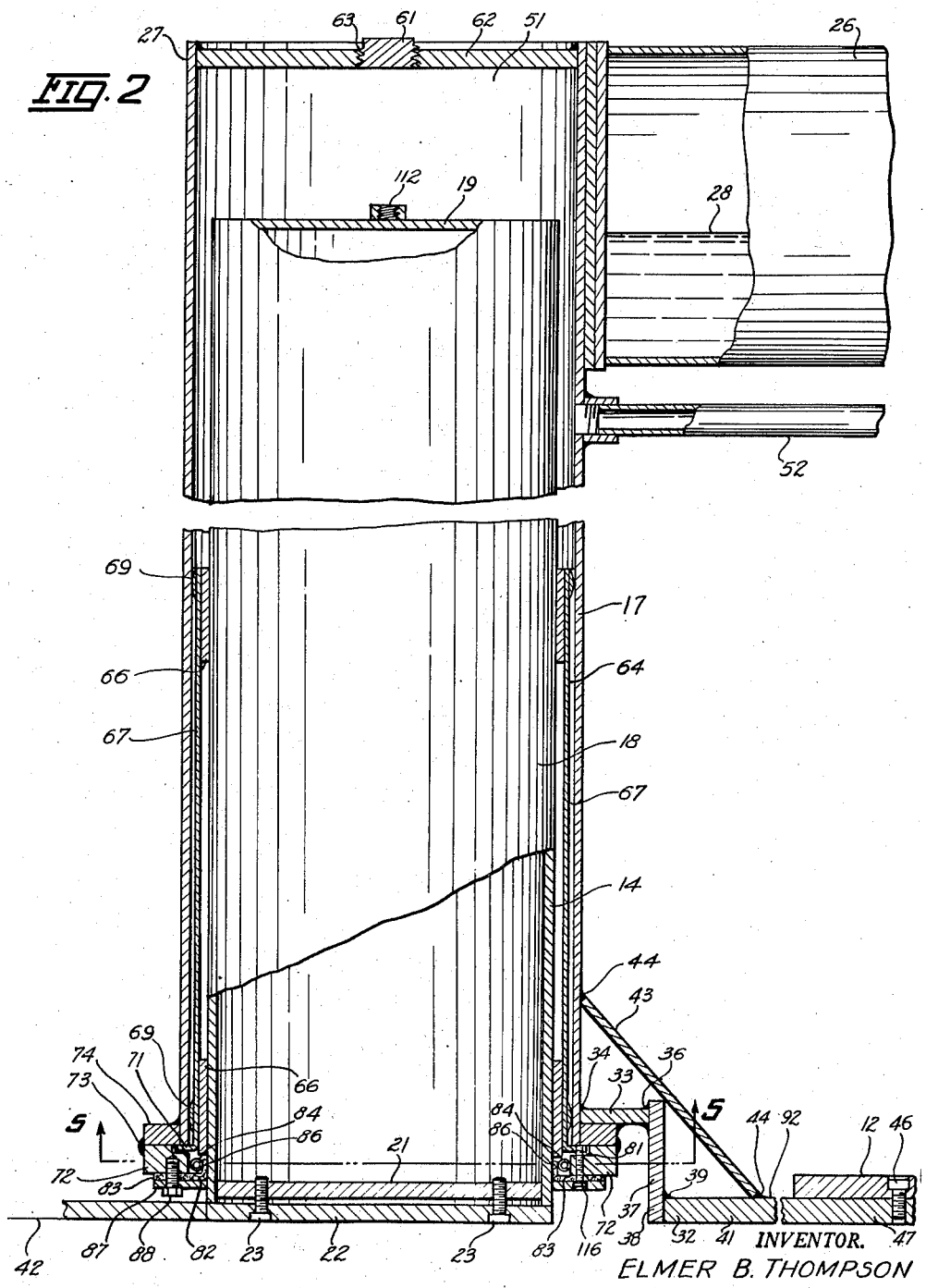

March 25, 1958 E. B. THOMPSON 2,827,979
VEHICLE LIFT
Filed Nov. 24, 1954 5 Sheets-Sheet 4

INVENTOR.
ELMER B. THOMPSON
BY
Rudolph L. Lowell
ATTORNEY.

March 25, 1958  E. B. THOMPSON  2,827,979
VEHICLE LIFT
Filed Nov. 24, 1954 5 Sheets-Sheet 5
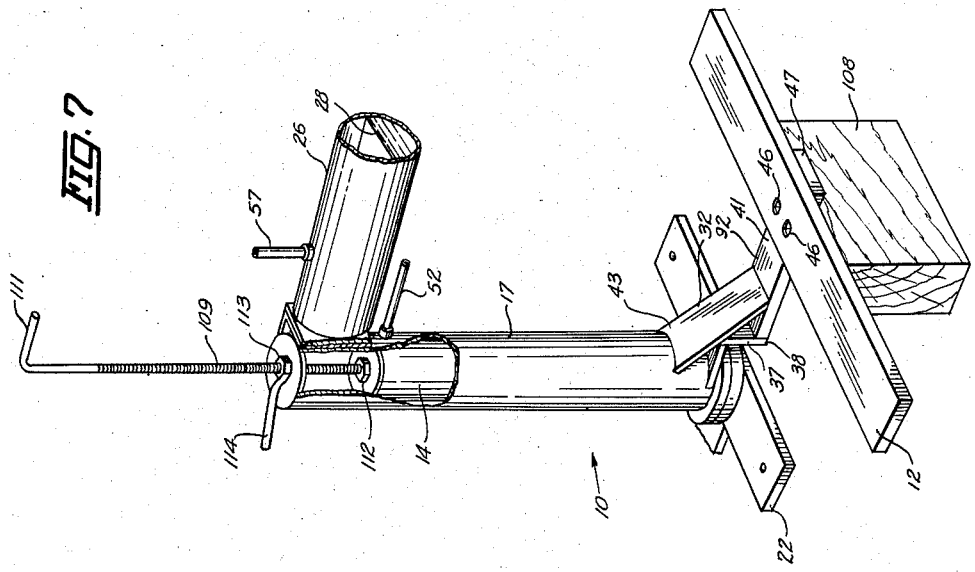
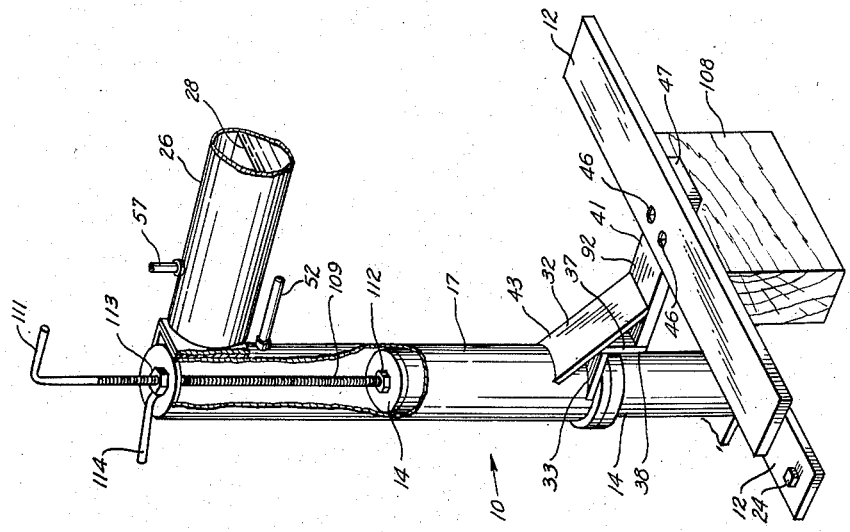
INVENTOR.
ELMER B. THOMPSON
BY
ATTORNEY.

United States Patent Office 2,827,979
Patented Mar. 25, 1958

2,827,979

VEHICLE LIFT

Elmer B. Thompson, Des Moines, Iowa, assignor to Globe Hoist Company, Des Moines, Iowa, a corporation of Iowa Application November 24, 1954, Serial No. 470,870

3 Claims. (Cl. 187—8.41)

This invention relates generally to vehicle lifts or hoists and more particularly to a vehicle lift in which a vehicle is elevated in response to upward movement of a pair of lift members arranged on transversely opposite sides of the vehicle.

An object of this invention is to provide an improved vehicle lift.

A further object of this invention is to provide a vehicle lift which is supported on and positioned entirely above a floor surface to eliminate the requirement for digging a pit for any of the lift parts.

Another object of this invention is to provide a vehicle lift which includes a pair of upright lift members adapted to be arranged on transversely opposite sides of the vehicle to be elevated, and a stabilizer member extended between the lift members at a position above the vehicle for insuring a synchronized up and down movement of the lift members.

A further object of this invention is to provide a vehicle lift having a vertically movable lift frame in which the structure for moving the frame is incorporated in and forms a part of the lift frame.

Another object of this invention is to provide a vehicle lift having a vertically movable lift frame of a generally inverted U-shape, with a fluid reservoir for supplying the fluid for raising the hoist constituting an integral part of the lift frame.

Yet another object of this invention is to provide a vehicle lift which includes a pair of transversely spaced hydraulic lift members which are connected at their upper ends by a stabilizer member which constitutes an oil reservoir for use in elevating the lift members.

A further object of this invention is to provide a floor mounted vehicle hoist of frame engaging type to provide complete accessibility to the underside of a vehicle in the elevated position thereof.

Still a further object of this invention is to provide a vehicle lift which is economical to manufacture and install, simple in construction, and efficient in operation to elevate a vehicle.

Further objects, features, and advantages of this invention will become apparent from a consideration of the following description when taken in connection with the accompanying drawing in which:

Fig. 1 is a perspective view of the vehicle lift of this invention;

Fig. 2 is an enlarged fragmentary longitudinal sectional view of a portion of the lift shown in Fig. 1;

Fig. 3 is a reduced plan view of the lift shown in Fig. 1, and showing, in diagrammatic form, a vehicle in a position to be elevated thereby;

Fig. 4 is a perspective view of a bearing cage which forms a part of the vehicle lift of this invention;

Figs. 6 and 7 are reduced perspective views of the vehicle lift of this invention, illustrating the manner in which the fluid seal units for the lift are serviced or replaced.

Figure 5:
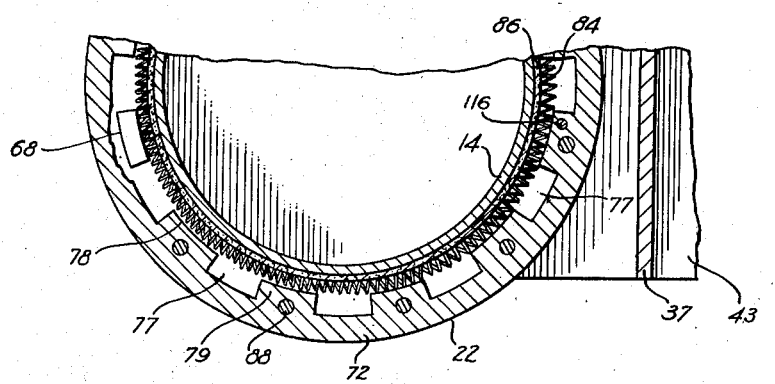
Fig. 5 is a transverse sectional view as seen along the line 5—5 in Fig. 2, with some parts broken away for the purpose of clarity.

With reference to the drawing, the vehicle lift of this invention, indicated generally at 10, is illustrated in Fig. 1 as including a lift frame 11 of a generally inverted U-shape which carries a pair of spaced vehicle supporting members 12 extended transversely of the lift frame 11. The upright tubular leg sections 17 of the frame 11 are guidably supported for up and down movement on a pair of upright cylindrical supports 14 corresponding to the leg sections 17.

Each support member 14 (Fig. 2) consists of an upright elongated tube member 18 closed at its lower end by a transverse plate 21. An elongated mounting plate 22 parallel to the vehicle supporting members 12 is secured to a plate 21 at the lower end of the supporting member 14 by Allen screws 23 extended upwardly through the mounting plate 22 into the plate 21. A mounting plate 22 is in turn secured to the floor surface indicated at 42 in Fig. 2, on which the lift 10 is mounted by upright screws 24 (Fig. 1).

It is seen, therefore, that the upright supports 14 are secured to and extended upwardly from the floor 42, at positions spaced transversely of the lift 10, by the mounting plates 22.

The U-shape lift frame 11 includes the upright tubular leg sections 17 and a tubular stabilizing member 26 which is connected to and extended between the leg sections 17 adjacent the upper ends 27 thereof and constitutes the base section of the U-frame 11. For a purpose to appear later, the tubular stabilizer member 26 is filled with a quantity of fluid 28 (Fig. 2) and thus constitutes a fluid reservoir.

The leg sections 17 carry the vehicle supporting members 12, corresponding to and arranged between the leg sections 17 at positions spaced apart a distance to engage the longitudinal frame members 31 (Fig. 3) of a vehicle, indicated diagrammatically at 30, arranged between the leg sections 17.

As best appears in Figs. 1 and 2 a vehicle frame engaging member 12 is connected to the lower end of the corresponding leg section 17 by means of a rigid supporting unit 32. A supporting unit 32 includes a horizontal plate 33 welded, as indicated at 34, to the lower end of the leg section 17 and extended inwardly of the lift frame 11. The opposite end of the plate 33 is connected, by means of welding 36, to the upper end of an upright plate 37, the lower end 38 of which is secured, by welding 39, to one end of an elongated supporting plate 41 extended inwardly of the lift frame 11 at a position to rest on the floor surface 42 in the lowered position of the lift 10 illustrated in Fig. 2.

An inclined brace 43, arranged above the plate 41, is secured at its ends, as by welding 44, to the leg section 17, adjacent the lower end thereof, and an intermediate portion of the plate 41. A frame engaging member 12 extends transversely of a plate 41 adjacent the inner end 47 thereof, and is secured to the top side of the plate 41 by a pair of Allen screws 46.

It is seen, therefore, that the lift frame 11, including the combination stabilizer and fluid reservoir 26, which is an integral part of the lift frame 11, and the vehicle frame engaging member 12 are movable vertically, as a unit, on the upright supports 14.

As best appears in Fig. 2, a lift frame leg section 17 is longer and of a slightly greater diameter than a corresponding support member 14 to thus provide a chamber 51 between the leg section 17 and the support 14. The chambers 51 communicate with the fluid reservoir 26 through a fluid line 52, open at its ends 53 to the chambers 51, extended between the leg sections 17. A shut-off valve 54 (Fig. 1) interposed in a fluid line 56 extended between the reservoir 26 and the line 52, controls the flow of fluid between the reservoir 26 and the chambers 51.

Extended upwardly from the top side of the reservoir 26 is an air line connection 57 which communicates, through a line 58, with a supply of compressed air (not shown). Interposed in the line 58 is a valve 59, of usual type, which is operable to communicate the connection 57 with the source of compressed air and to communicate the connection 57 with atmosphere through an exhaust connection 60 on valve 59 for a purpose to more clearly appear hereinafter.

It is seen, therefore, that on manipulation of the valve 59 to supply air under pressure to the reservoir 26, the fluid 28 in the reservoir is forced under pressure through the outlet line 56 to the shutoff valve 54. On opening of the shutoff valve 54, the fluid 28 is forced under pressure through the fluid lines 52 to the chambers 51. A closure plug 61 (Fig. 2) in a plate 62 secured to the upper end of a leg section 17 so as to close the upper end of the leg section 17 is initially loosened to bleed air from a chamber 51 as fluid is forced into the chamber 51 through the fluid lines 52. As soon as fluid appears at the opening 63, the plug 61 is tightened, as it is then apparent that all of the air within the chamber 51 has been exhausted.

On further admission of fluid into the chambers 51, upward forces are exerted on the plates 62 by the fluid under pressure in the chambers 51. The lift frame 11 is thus elevated on the supports 14 which guidably support the frame 11 during the upward movement thereof.

For facilitating the vertical travel of each leg section 17 on its corresponding support 14, each leg section 17 carries therein a bearing assembly or cage 64 (Figs. 2 and 4) which moves up and down on the corresponding support 14.

As best appears in Fig. 4, a bearing assembly or cage 64 consists of a pair of vertically spaced bearing rings 66 connected by a series of spaced elongated strap members 67 having outwardly extended lower end portions 68. Secured to and extended about the strap members 67, at positions intermediate the ends of the bearing rings 66, are a pair of annular spacer rings 69, of a diameter to fit within a leg section 17.

A bearing cage 64 is maintained at a position within a leg section 17, with the horizontal end portions 68 of the strap members 67 against the lower end 71 of the leg section 17, by an annular retainer ring 72 (Figs. 2 and 5) secured, as by welding 73, to a ring 74 secured to and extended about the lower end of the leg section 17, at a position below the attachment of the plate 33 in a supporting unit 32 to the leg section 17.

As best appears in Fig. 5, the retainer ring 72 is provided with peripherally spaced cut out portions or openings 77 on its inner surface 78, with the size and shape of the openings 77 corresponding to the size and shape of the outwardly extended portions 68 at the lower ends of the strap members 67. The portions 79 of the retainer ring 72 between the openings 77 likewise correspond in size and shape to the strap portions 68 and are provided with horizontal slots 81 of a size to receive the strap portions 68 therein. By virtue of this construction of the retainer ring 72 with the openings 77 and the slots 81, the bearing cage 64 is readily removable from the leg section 17, through the lower open end 71 thereof, in a manner to be more fully described hereinafter.

Arranged below the bearing cage 64, and about the support 14 is an annular fluid seal or packing assembly 82 which includes a compressible packing member 83 and a spring retaining ring 84. As best appears in Fig. 2, the packing member 83 is arranged against the under side of the retainer ring 72, with a portion 86 of the packing 83 extended upwardly about the support 14 to a position adjacent the lower one of the bearing rings 66. The spring ring 84 (Figs. 2 and 5) extends about the portion 86 of the packing 83 to hold the portion 86 in fluid tight engagement with the support 14. An annular ring 87 is positioned against the underside of the packing 83 and is secured to the retainer ring 72 by bolts 88 for holding the packing assembly 82 in position about the support 14.

It is seen, therefore, that a packing assembly 82 is movable with a frame leg section 17 in a fluid tight relation with the corresponding support 14, to thereby prevent any leakage of fluid from the chamber 51 in the leg 17 downwardly about the support 14.

In the operation of the hoist 10, a vehicle to be elevated is driven to a position between the lift frame leg sections 17, such that the vehicle main frame side members 31 (Fig. 3) are positioned above the frame engaging members 12 carried by the lift frame 11. During travel of the vehicle between the leg sections 17, the vehicle wheels 91 travel over intermediate portions 92 of the supporting plates 41 for the members 12, between the members 12 and the braces 43. The lift 10 thus operates as a frame engaging type of vehicle hoist, in a manner described in detail in my prior Patent No. 2,593,630. It is apparent that in the various vehicles now in use, the side frame members 31 therefor are not uniformly spaced, and for adapting the lift 10 of all of such vehicles, adaptor members of the type shown in my prior Patent No. 2,612,344 may be provided for the members 12.

With the vehicle side frame members 31 arranged above the frame engaging members 12, the valve 59 in the air line 58 is manipulated to supply compressed air to the fluid reservoir 26. The fluid shut-off valve 54 is opened, by manipulation of a lever 93 (Fig. 1), to supply fluid to the chambers 51 in the leg sections 17 from the reservoir 27.

As shown in Fig. 1, the lever 93 is mounted on an upright square shaft 94 rotatably carried in and extended upwardly from an upright tube 96 supported on a plate 97 secured to the adjacent supporting plate 22. Adjacent its upper end 98, the shaft 94 is extended through an oversized opening 99 in a guide arm 101 connected to and extended outwardly from a leg section 17. A link 102 connected at one of its ends to the upper end 98 of the shaft 94 is connected, at 103, at its opposite end to one end of a longer link 104. The opposite end of the link 104 is, in turn, connected to a link 106 which is connected to the valve 54 for opening and closing the valve 54.

Thus, on manipulation of the lever 93, which is arranged adjacent the upper end 107 of the tube 96 at a convenient elevation for manual operation by the lift operator, to rotate the shaft 94, the link 106 is oscillated to open or close the valve 54. On upward movement of the lift frame 11, the shaft 94 moves upwardly in the support tube 96, and through the lever 93, which remains at the upper end 107 of the tube 96.

On supply of fluid under pressure to the chambers 51, equal upward forces are exerted by such fluid on the plates 62 at the upper ends of the leg sections 17 to thus move the leg sections 17 upwardly on the upright supports 14. The rigid connection of the combination reservoir and stabilizer members 26 between the leg sections 17 assures a coordinated or synchronized upward movement of the leg sections 17 on the upright supports 14.

The bearing cages 64 move upwardly with the legs 17, and provide for a smooth upward movement of the legs 17 on the supports 14. The packing assemblies 82 also move upwardly on the upright supports 14 and act to prevent any leakage of fluid from the chambers 51 downwardly on the support 14.

The lift frame 11 is locked in a raised or partially raised position by manipulation of the lever 93 to close the fluid supply valve 54 which acts to hold the fluid in the chambers 51 and prevent any downward movement of the lift frame 11 on the supports 14.

The lift frame 11 is lowered merely by manipulation of the valve 59 in the air line 58 to communicate the reservoir 26 with the exhaust outlet 60 on the valve 59. The weight of the lift frame 11 forces fluid from the chambers 51 into the reservoir 26, with this fluid displacing air in the reservoir 26 to force the air through the exhaust outlet 60 on the valve 59.

It is seen, therefore, that in the operation of the lift 10, the leg sections 17 of the lift frame 11 constitute cylinders which move up and down on the supports 14 which thus function as pistons to force the fluid out of the cylinders 17 during lowering of the lift frame. Each cylinder 17 carries a vehicle frame engaging member 12 and thus constitutes a lift member for raising a frame engaging member 12, with each lift member 17 coacting with a piston 14 to function as the lift unit.

In the event a packing unit 82 requires repair or replacement, the lift frame 11 is raised slightly (Fig. 6) and then lowered so that the frame engaging members 12 are supported on wooden blocks 108 (only one of which is shown) or the like. The bolts 24 which secure a mounting plate 22 to the floor surface 42 are then removed for a purpose to appear presently.

The plug 61 in the upper end of the corresponding cylinder 17 is removed and a threaded rod 109 (Fig. 6) having a laterally extended handle 111 at its upper end is extended loosely through the opening 63 for the plug 61 and threaded into a nut 112 secured to the upper end of the piston 14. A second nut 113, provided with a handle 114 is threaded onto the rod 109 into engagement with the upper end of the cylinder 17 at a position about the opening 63. On manipulation of the handle 114 to further advance the nut 113 on the rod 109, the piston 14 and the mounting plate 22 therefor, are moved upwardly off the floor surface 42 (Fig. 7). Upward movement of the piston 14 in the cylinder 17 is continued until the plate 22 has been raised a distance off the floor surface 42 to provide access to the screws 23 (Fig. 2) which secure the plate 22 to the piston 14, as shown in Fig. 7.

The screws 23 and the plate 22 are then removed from the piston 14 to permit movement of the annular packing unit 82 off the lower end of the piston 14. The screws 88 which hold the packing unit 82 and the retainer ring 87 therefor on the bearing cage retainer ring 72 are then removed along with an Allen screw 116 (Figs. 2 and 5) which is threaded into the retainer ring 72 and extends into a drilled hole 117 (Fig. 5) in one of the bearing strap portions 68. In the assembled position of the bearing cage 64, and the retainer ring 72 therefor (Fig. 2), which is secured to the cylinder 17, the screw 116 maintains the bearing cage 64 against any rotational movement relative to the cylinder 17.

After removal of the screws 88 and 116, the packing unit 82 is readily moved downwardly off the lower end of the piston 14.

To repair or replace a bearing cage 64, the lift frame 11 is initially supported on blocks, similar to the blocks 108 (Figs. 6 and 7), of a length longer than a bearing cage 64. After removal of the packing unit 82 corresponding to the cage 64 to be removed, the cage 64 is rotated in the cylinder 17, by manually grasping the cage 64 at the lower end thereof. The cage 64 is rotated until the laterally extended strap portions 68 at the lower end thereof are vertically aligned with the openings 77 in the retainer ring 72. The cage 64 is then readily moved downwardly off the lower end of the piston 14, with the strap portions 68 moving through the openings 77 in the ring 72.

On re-assembly of the cage 64 with the piston 14 and the cylinder 17, the cage 64 is moved upwardly on the piston 14, with the strap portions 68 aligned with the openings 77 in a retainer ring 72. When the cage 64 has been moved to a position in which the strap portions 68 are against the lower end 71 of the cylinder 17, the cage 64 is manually rotated to position the portions 68 in the slots 81 in the ring 72. After assembly of the packing unit 82 on the piston 14, the screw 116 is extended through the retainer ring 72 into the opening 117 in one of the bearing strap portions 68 to again maintain the cage 64 against rotation relative to the cylinder 17.

It is seen, therefore, that a bearing cage 64 and a packing unit 82 are constructed and assembled on the cylinder 17 so as to be readily removable therefrom. As a result, the lift frame 11 has the enclosed parts thereof readily accessible for servicing purposes.

Figure 8:
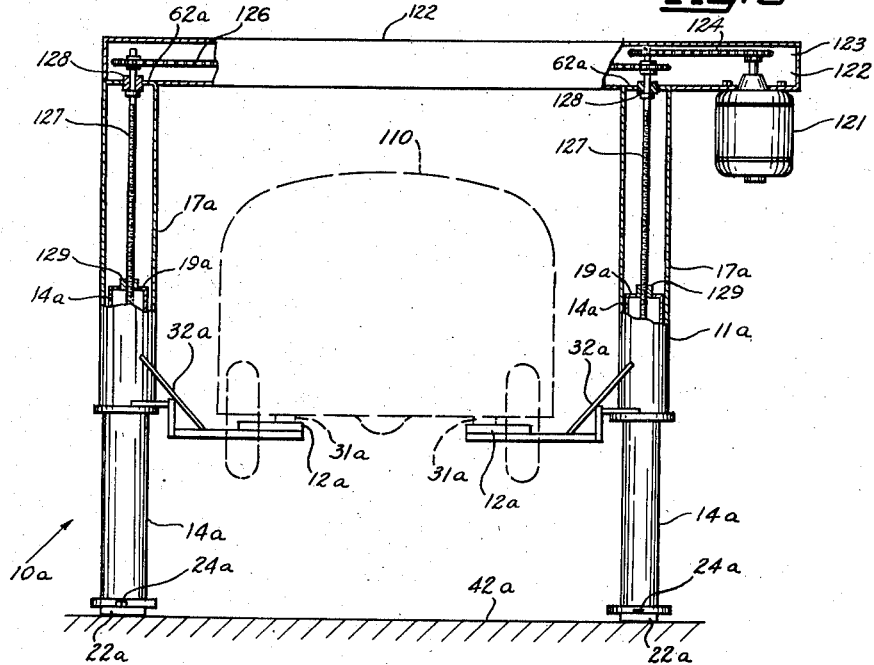
Fig. 8 is a front elevational view of a modified form of lift of this invention, with some parts broken away and other parts shown in section for the purpose of better illustrating the construction of the lift.

The modified lift 10a shown in Fig. 8 is similar to the lift 10 except for the type of power utilized in raising the lift frame 11a. Like numerals having the suffix "a" are applied, therefore, to the lift 10a to designate like structure in the lift 10.

The lift frame 11a is raised by mechanical structure operated by a reversible electric motor 121, in contrast to the hydraulic operation described above for the lift 10, and operates, like the lift 10, to raise a vehicle, indicated diagrammatically at 110, by engaging the frame members 31a thereof. Accordingly, the combination stabilizer and fluid reservoir 26 in the lift 10 is replaced in the lift 10a by a hollow stabilizer member 122, extended across the upper ends of the lift cylinders 17a, and having an extended end portion 123 which carries the motor 121. A sprocket chain 124, arranged within the stabilizer 122 and driven by the motor 121, in turn drives a second chain 126 arranged in a driving relation with the upper ends of a pair of shafts 127 arranged within the cylinders 17a.

A shaft 127 is supported in and secured to a thrust bearing 128 mounted in the upper end plate 62a of a cylinder 17a, and extends downwardly into the piston 14a. The shaft 127 is threadably mounted in a nut 129 secured to the top plate 19a for a piston 14a so that on rotation of the shaft 127, the shaft is moved up and down relative to the piston 14a. As a result, the thrust bearings 128 and cylinders 17a are moved up and down with the shafts 127 to thus move the lift frame 11a up and down on the pistons 14a.

It is seen, therefore, that on operation of the motor 121 to rotate the shafts 127, by means of the sprocket chains 124 and 126, the lift frame 11a is moved relative to the pistons 14a. On rotation of the shafts 127 in one direction, the lift frame 11a is raised and on rotation of the shafts 127 in the opposite direction, the lift frame 11a is lowered, with the stabilizer 122 acting to insure a coordinated up and down movement of the cylinders 17a for the lift frame 11a. Since the stabilizer 122 carries the motor 121 and the chains 124 and 126 for driving the shafts 127, the stabilizer 122 also constitutes a housing and support for the power means utilized in moving the lift frame 11a.

From the above description, it is seen that this invention provides a hydraulic hoist 10 and a mechanical hoist 10a, with both of the hoists 10 and 10a being supported entirely above the floor surface 42. As a result, the hoists 10 and 10a are readily and inexpensively installed in practically any location. The stabilizer members 26 and 122 for the hoists 10 and 10a, respectively, provide for a coordinated up and down movement of the lift members for the hoists in addition to functioning as the power means for operating the hoists. By virtue of this construction, the hoists 10 and 10a can be produced with a minimum number of parts which take up a minimum amount of space when installed.

Although the invention has been described with respect to several embodiments thereof, it is to be understood, that it is not to be so limited, since changes can be made therein which are within the full intended scope of this invention as defined by the appended claims.

I claim:

1. For use in elevating a vehicle above a floor surface, a vehicle hoist comprising a pair of upright floor supported piston members, upright cylinder members corresponding to said piston members, and movable up and down relative thereto, means including a fluid reservoir member connected to and extended between said cylinder members adjacent the upper ends thereof, means carried by said cylinders for engaging a vehicle to be elevated, and means operatively associated with said reservoir means for supplying fluid under pressure to said cylinder members to raise the cylinders on said pistons.

2. A vehicle lift comprising a pair of spaced upright hydraulic cylinder assemblies, with each assembly including a piston member and a cylinder member, and with one of said members being mounted for up and down movement relative to the other of said members, means carried by said assemblies for engaging and elevating a vehicle arranged between said assemblies, a combination fluid reservoir and stabilizer connected to and extended between said assemblies adjacent the upper ends thereof, said reservoir being in fluid communication with said assemblies, and means for forcing fluid under pressure from said reservoir to said assemblies for operating said assemblies to raise said vehicle engaging means.

3. For use in elevating a vehicle above a floor surface, a pair of upright spaced piston members supported at their lower ends on said floor surface, an inverted U-shape lift frame having tubular leg sections received on said piston members in a fluid tight relation therewith, and a tubular base section extended between said leg sections, fluid in said base section, means forming fluid receiving chambers in said leg sections above said pistons, means for selectively communicating the fluid in said base section with said chambers, means for selectively applying pressure to the fluid in said base section, and means carried by and arranged between said leg sections for engaging a vehicle to be elevated.

References Cited in the file of this patent

UNITED STATES PATENTS

| | | |
|---|---|---|
| 2,074,148 | Hott | Mar. 16, 1937 |
| 2,235,246 | Anthony | Mar. 18, 1941 |
| 2,259,558 | Evans | Oct. 21, 1941 |
| 2,569,837 | Villars | Oct. 2, 1951 |
| 2,593,635 | Walker | Apr. 22, 1952 |
| 2,639,784 | Strock | May 26, 1953 |
| 2,754,934 | Wallace et al. | July 17, 1956 |